(12) United States Patent
Meijer et al.

(10) Patent No.: US 8,321,836 B2
(45) Date of Patent: Nov. 27, 2012

(54) LATE BOUND PROGRAMMATIC ASSISTANCE

(75) Inventors: Henricus Johannes Maria Meijer, Mercer Island, WA (US); Amanda Silver, Seattle, WA (US); Paul A. Vick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1518 days.

(21) Appl. No.: 11/766,347

(22) Filed: Jun. 21, 2007

(65) Prior Publication Data

US 2008/0320444 A1 Dec. 25, 2008

(51) Int. Cl.
G06F 9/44 (2006.01)
(52) U.S. Cl. ........................................... 717/113
(58) Field of Classification Search ............... 717/107, 717/117, 131, 140, 141, 144, 113; 719/328, 719/332; 707/200; 715/536, 709
See application file for complete search history.

(56) References Cited

U.S. PATENT DOCUMENTS

| | | | |
|---|---|---|---|
| 5,485,615 A | 1/1996 | Wennmyr | |
| 5,500,881 A * | 3/1996 | Levin et al. | 717/141 |
| 5,579,518 A | 11/1996 | Yasumatsu | |
| 5,687,377 A | 11/1997 | Pasquariello | |
| 5,692,195 A | 11/1997 | Conner | |
| 5,696,974 A | 12/1997 | Agrawal | |
| 5,742,828 A | 4/1998 | Canady | |
| 5,748,961 A | 5/1998 | Hanna | |
| 5,748,963 A | 5/1998 | Orr | |
| 5,842,220 A * | 11/1998 | De Groot et al. | 1/1 |
| 5,872,973 A * | 2/1999 | Mitchell et al. | 719/332 |
| 5,983,021 A | 11/1999 | Mitrovic | |
| 6,018,628 A | 1/2000 | Stoutamire | |
| 6,023,583 A | 2/2000 | Honda | |
| 6,041,179 A | 3/2000 | Bacon | |
| 6,072,950 A | 6/2000 | Steensgaard | |
| 6,126,330 A | 10/2000 | Knight | |
| 6,134,708 A | 10/2000 | Yui | |
| 6,237,135 B1 * | 5/2001 | Timbol | 717/107 |
| 6,415,316 B1 | 7/2002 | Van der Meer | |
| 6,425,124 B1 | 7/2002 | Tominaga | |
| 6,560,774 B1 | 5/2003 | Gordon | |
| 6,678,745 B1 | 1/2004 | Hodge | |
| 6,842,877 B2 | 1/2005 | Robarts | |
| 6,915,301 B2 | 7/2005 | Hirsch | |
| 6,928,425 B2 | 8/2005 | Grefenstette | |
| 6,957,394 B1 | 10/2005 | Fernandez | |
| 6,981,249 B1 * | 12/2005 | Knoblock et al. | 717/141 |
| 7,017,117 B2 | 3/2006 | Capps | |
| 7,051,322 B2 | 5/2006 | Rioux | |
| 7,120,897 B2 | 10/2006 | Ebbo | |
| 7,127,707 B1 | 10/2006 | Mishra | |
| 7,137,069 B2 | 11/2006 | Abbott | |

(Continued)

OTHER PUBLICATIONS

Stan Schultes. Language Enhancements in Visual Basic 2005. Oct. 2004. http://msdn2.microsoft.com/en-us/library/ms379584(vs.80).aspx. Last accessed Apr. 2, 2007.

(Continued)

Primary Examiner — Tuan A Vu
(74) Attorney, Agent, or Firm — Workman Nydegger

(57) ABSTRACT

Programmatic assistance is provided for dynamic typing within an integrated development environment (IDE). Types associated with late bound constructs can be inferred from static information and/or determined from design time execution. Assistance can then be provided as a function of a precise and/or speculative type. Furthermore, dynamic type assistance can be employed in conjunction with static type assistance to facilitate development of a program that supports both late and early binding, for example.

20 Claims, 12 Drawing Sheets

U.S. PATENT DOCUMENTS

| | | |
|---|---|---|
| 7,152,229 B2 | 12/2006 | Chong |
| 7,197,702 B2 | 3/2007 | Niyogi |
| 7,246,361 B1 | 7/2007 | Scalora |
| 7,389,498 B2 | 6/2008 | Meijer |
| 7,730,448 B2 | 6/2010 | Meijer |
| 7,958,493 B2 | 6/2011 | Lindsey |
| 2002/0016953 A1 | 2/2002 | Sollich |
| 2002/0095657 A1 | 7/2002 | Vaidyanathan |
| 2002/0095658 A1 | 7/2002 | Shulman |
| 2003/0023957 A1 | 1/2003 | Bau |
| 2003/0079199 A1 | 4/2003 | Barsness |
| 2003/0131347 A1 | 7/2003 | Allison |
| 2004/0098731 A1* | 5/2004 | Demsey et al. ............. 719/328 |
| 2005/0004973 A1 | 1/2005 | Snover |
| 2005/0081139 A1 | 4/2005 | Witwer |
| 2005/0086360 A1 | 4/2005 | Mamou |
| 2005/0091531 A1 | 4/2005 | Snover |
| 2005/0114771 A1* | 5/2005 | Piehler et al. ............. 715/536 |
| 2005/0198177 A1 | 9/2005 | Black |
| 2005/0278695 A1 | 12/2005 | Synovic |
| 2006/0015817 A1 | 1/2006 | Fioretti |
| 2006/0026559 A1 | 2/2006 | Gunturi et al. |
| 2006/0031263 A1* | 2/2006 | Arrouye et al. ............. 707/200 |
| 2006/0173911 A1 | 8/2006 | Levin |
| 2006/0206391 A1 | 9/2006 | Delson |
| 2007/0055978 A1 | 3/2007 | Meijer |
| 2007/0256060 A1 | 11/2007 | Ryu |
| 2008/0320453 A1 | 12/2008 | Meijer |

OTHER PUBLICATIONS

Andy D. Pimentel. A Case for Visualization-integrated System-level Design Space Exploration http://staff.science.uva.nl/~andy/artemis/samos05.pdf. Last accessed Apr. 2, 2007.

eWay Ltd http://www.eway.co.uk/interdevtricks.html#IntellisenseWorkarounds. Last accessed Apr. 2, 2007.

International Search Report dated mailed Dec. 29, 2008 for PCT Application Serial No. PCT/US2008/066149, 9 Pages.

Office Action dated Aug. 2, 2012 cited in U.S. Appl. No. 11/766,345.

Author Unknown, Theme Development, http://codex.wordpress.org/User:JPAUL/Theme_Development, Available at least as early as Mar. 30, 2007 (12 pages).

Ravikumar Raja, Themes in ASP.NET 2.0., Aug. 26, 2006 (14 pages).

U.S. Appl. No. 11/766,345, Mar. 1, 2012, Office Action.

Wright, et al., "A Practical Soft Type System for Scheme", 1994, ACM, p. 250-262.

Pnizzi, et al., "On the Return Types of Virtual Functions", 1999, ACM, p. 37-42.

U.S. Appl. No. 11/201,507, Sep. 3, 2008, Office Action.

U.S. Appl. No. 11/201,507, Mar. 23, 2009, Office Action.

U.S. Appl. No. 11/201,507, Feb. 22, 2010, Notice of Allowance.

U.S. Appl. No. 11/220,167, Feb. 6, 2009, Office Action.

U.S. Appl. No. 11/220,167, Aug. 7, 2009, Office Action.

U.S. Appl. No. 11/220,167, Jan. 20, 2010, Office Action.

U.S. Appl. No. 11/220,167, Jul. 7, 2010, Office Action.

* cited by examiner

LATE BOUND PROGRAMMATIC ASSISTANCE

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

A programmer using one or more programming languages creates the instructions comprising a computer program. Typically, source code is specified or edited by a programmer manually and/or with help of an integrated development environment (IDE). Subsequently, the source code can be compiled or otherwise transformed by another program into computer instructions executable by a computer or like device.

By way of example, a programmer may choose to implemented code utilizing an object-oriented programming language (e.g., Visual Basic, C#, Java . . . ). In accordance with such a paradigm, programmers will create a number of classes identifying properties and characteristics of an abstract thing as well as methods describing class behavior or abilities. Specific programmatic logic can then be specified as interactions between instances of classes or objects, among other things. Subsequently, executable code for a particular machine can be produced by an associated compiler. Alternatively, code can be transformed into intermediate code (e.g., CIL (Common Intermediate Language), Java Byte Codes . . . ) for a target virtual machine to facilitate execution on multiple computer platforms via further compilation or interpretation of the intermediate code.

Conventionally, programming languages are either statically typed or dynamically typed. Types provide constraints on the interpretation of data in accordance with a language type system. Accordingly, types can be utilized to detect programming errors via a type checking. In other words, a degree of program safety can be obtained by detecting meaningless or likely invalid code as a function of data types. This can be accomplished either statically or dynamically. A statically typed language enables a program to be type checked at compile time. Accordingly, all types are known at compile time, for example by explicit specification or type inference. Dynamically typed languages differ in that they are type checked at runtime. As a consequence, types need not be explicitly specified prior to use, rather they are determined during execution.

When selecting a language, programmers need to consider tradeoffs between static and dynamic typing. In particular, static typing is beneficial in that errors can be detected prior to execution and programs can execute very efficiently. Further, design time experience can be improved since assistance such as automatic fills and suggestions can be provided based on types. However, dynamically typed languages allow more programmatic flexibility than static typed languages while still providing a degree of type safety via runtime checking. Furthermore, dynamically typed languages are easier to use, as programmers need not be concerned with type specification.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to provisioning of programmatic assistance. More specifically, programmatic assistance can be provided with respect to dynamic/late bound types and/or calls. Dynamic type assistance can be employed alone or in conjunction with static type assistance to facilitate overall program development. This enables a very agile programming style in which programmers start exploring a problem without having to worry about types. Subsequently as a design crystallizes, static typing can be added to provide type safety and efficient execution.

In accordance with one aspect of the disclosure, dynamic types can be ascertained from static information and/or design time execution. Static information such as that emerging from program flow analysis, program profile, programmer profile and prior runs can be utilized to identify approximate or speculative dynamic types. Additionally or alternatively, precise types can be identified from design-time program execution.

According to another aspect of the disclosure, programmatic assistance can be provided as a function of one or more identified static types. In one instance, such assistance can pertain to member listing and automatic code completion. In this case, members can be provided as a function of one or more precise and/or approximate types for selection and automatic code completion. Various techniques are also provided to supply users with relevant programmatic assistance.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are described with respect to late bound or dynamic type programmatic assistance within an integrated development environment. Precise and/or speculative types can be identified for constructs utilizing design time analysis and employed to provide useful assistance in program specification including automatic code completion. Various mechanisms can be utilized to provision the most relevant assistance. Furthermore, dynamic type program assistance can be provisioned in combination with static type program assistance.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
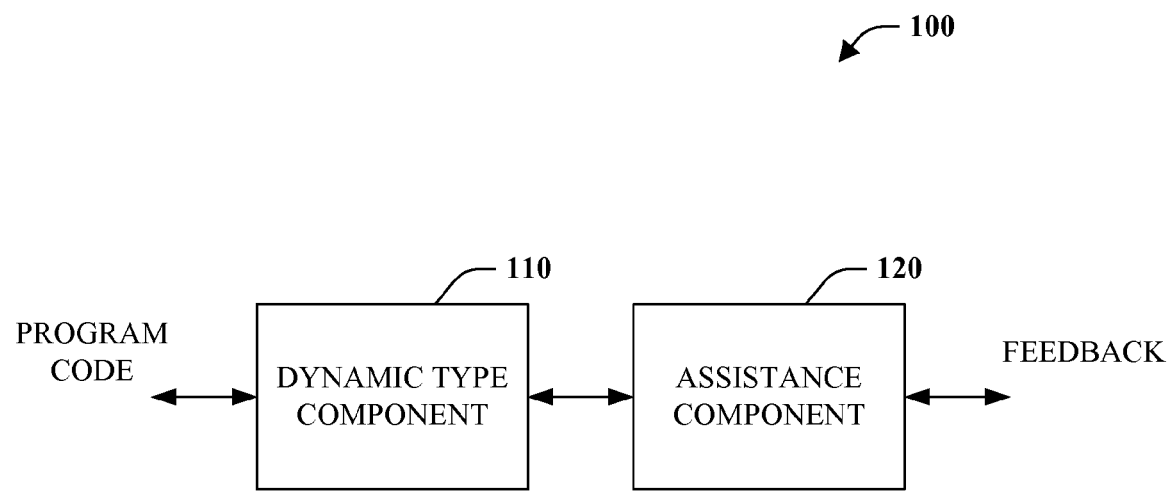
FIG. 1 is a block diagram of a program development system in accordance with an aspect of the claimed subject matter.

Referring initially to FIG. 1, a program development system 100 is illustrated in accordance with an aspect of the claimed subject matter. In one instance, the system 100 can correspond to an integrated development environment (IDE) or portions thereof including without limitation a code editor. Among other things, the program development system 100 includes a dynamic type component 110 and an assistance component 120.

The dynamic type component 110 is a mechanism for determining types for late bound programmatic constructs. As will be described in further detail below, the dynamic type component 110 is operable to determine, infer or otherwise identify or ascertain precise types and/or speculations or approximations of program data types. Moreover, dynamic type component 110 can identify one or more types at design time rather than execution time.

The assistance component 120 receives, retrieves or otherwise obtains or acquires type information produced by the dynamic type component 110 and generates feedback based thereon. Among other things, type based feedback can facilitate program or code specification. In one instance, the assistance component 120 can provide suggestions, recommendations or hints to aid programmers. By way of example and not limitation, where a programmer specifies an object receiver and a dot operator ("."), the assistance component 120 can provide a drop down menu that identifies several statement completion options including object members provided by identified receiver types or classes.

One advantage of program development system 100 is that it enables an agile programming style. One reason programmers use late bound types is that they want an easy way to start programming. They want to start "exploring" a problem space without being bogged down by type declaration and the like. This can be partially addressed with static type inference wherein programmers omit types where they can be inferred automatically. However, this is still restrictive in that variables can only be of a certain static type. Dynamic typing affords further flexibility or fluidness in the program development process. Unfortunately, conventional technologies discouraged such a programming style by not providing programmatic assistance at precisely the point at which feedback is most needed. Program development system 100 solves this problem by providing design time programmatic assistance or feedback with respect to dynamic or late bound types.

Figure 2:
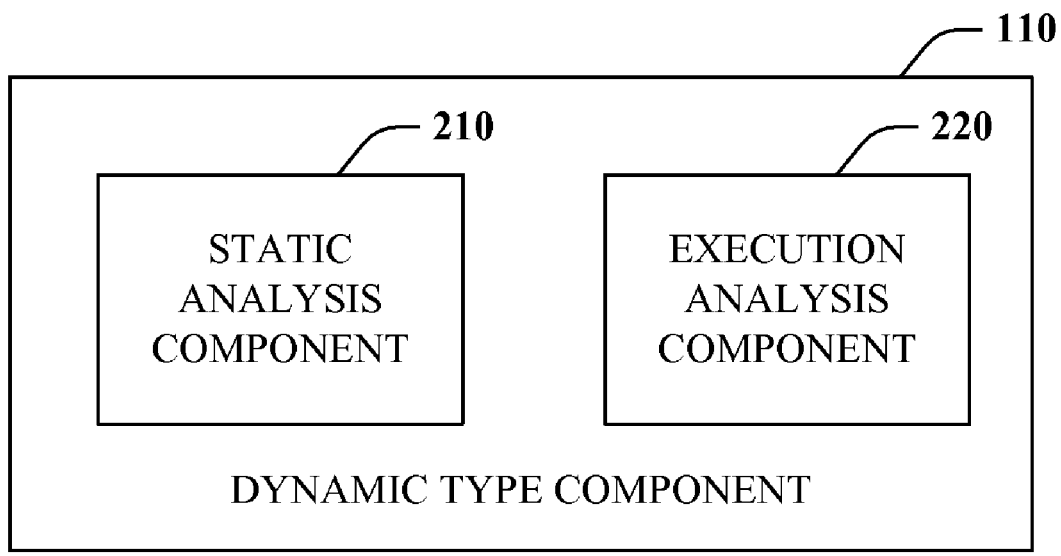
FIG. 2 is a block diagram of a representative dynamic type component.

Turning attention to FIG. 2, a representative dynamic type component 110 is illustrated in accordance with an aspect of this disclosure. Dynamic types can be determined or approximated utilizing static and/or execution analysis. Accordingly, the dynamic type component 110 includes a static analysis component 210 and an execution analysis component 220.

The static analysis component 210 provides a mechanism for approximating dynamic types with static information. Among other things, the static analysis component 210 can employ hard coded instructions, heuristics and/or machine learning to facilitate type identification. Additionally, more than one type can be identified since by definition the precise type is not likely to be able to be identified with absolute certainty statically. As a result, the static analysis component 210 can produce several possible or candidate dynamic types.

In one instance, the static analysis component 210 can perform program flow analysis (e.g. control and/or data . . . ) to determine candidate types. More specifically, at each call site in a program the static analysis component 210 can collect the union of all possible statically known types that a receiver of a late bound call can posses. By way of example and not limitation, consider the following code snippet:

```
Dim X As Object
If SomeCondition
    X = "Hello"
Else
    X = new Button( )
End If
```

In the first line of the code, the variable "X" is declared to be of type "Object." Accordingly, this can be a type of the variable "X" since it is explicitly declared. However, this is not extremely helpful in that "Object" is a root or super type, and in some languages, it is simply utilized to indicate that a variable, expression or the like is late bound. Moreover, the subsequent condition specifies types that are more specific. The condition is an "If, Then, Else" condition in which "X" is assigned the string "Hello" or instantiated as a new "Button." The result of such program flow analysis of the static analysis component 210 can be the set of types "String" and "Button" since they represent the potential types of the dynamically typed variable "X."

The set of potential types provided by the static analysis component 210 can be generated or influence by a plurality of other information. For example, previous program execution information can be utilized to identify a type. Additionally, program and/or programmer profile information or other context information can be considered with respect to inferring candidate dynamic types.

Furthermore, while the static type analysis component 210 can analyze an entire program including linked portions (e.g., APIs, libraries . . . ) in some instances this can be reduced for practicality. For instance, if no assignments have been made yet to a variable of type "Object" or if a parameter or function result has type "Object," the set of possible types can be unbounded. Consider for example, "Dim X As Object=F( )" or "Sub G (X As Object)," respectively. To reduce this to something practical, the static analysis component 210 can be limited by types that are in scope. For example, when "Object" is a method return type, the component 210 can do a global or whole program analysis to determine what the possible return types of F could be to reduce the number of hits. When an argument of type object is used, the static analysis component 210 can an perform a global analysis to find all possible places where "G" is called and determine a smaller set of possible types from these call sites.

The execution analysis component 220 of the dynamic type component 110 provides a mechanism to identify a precise dynamic type as a function of design time execution. Program execution can be performed in the background during program specification and dynamic type information can be retrieved from this execution. In one implementation, this can be accomplished utilizing a batch compiler and read-evaluate-print loop (REPL, or REPL loop) or modification thereof within a program development system such as an IDE. This is distinct from conventional employment of REPL, which involves utilizing an interactive REPL environment outside an IDE for dynamically typed code and cutting and pasting such code into a main program developed utilizing an IDE. Inside a program development system, code can be specified with breakpoints or the like to control background execution. By way of example, consider the previous code snippet including the "If, Then, Else" condition. If a breakpoint is provided after the condition, a precise dynamic type can be captured from execution, here either "String" or "Button."

Figure 3:
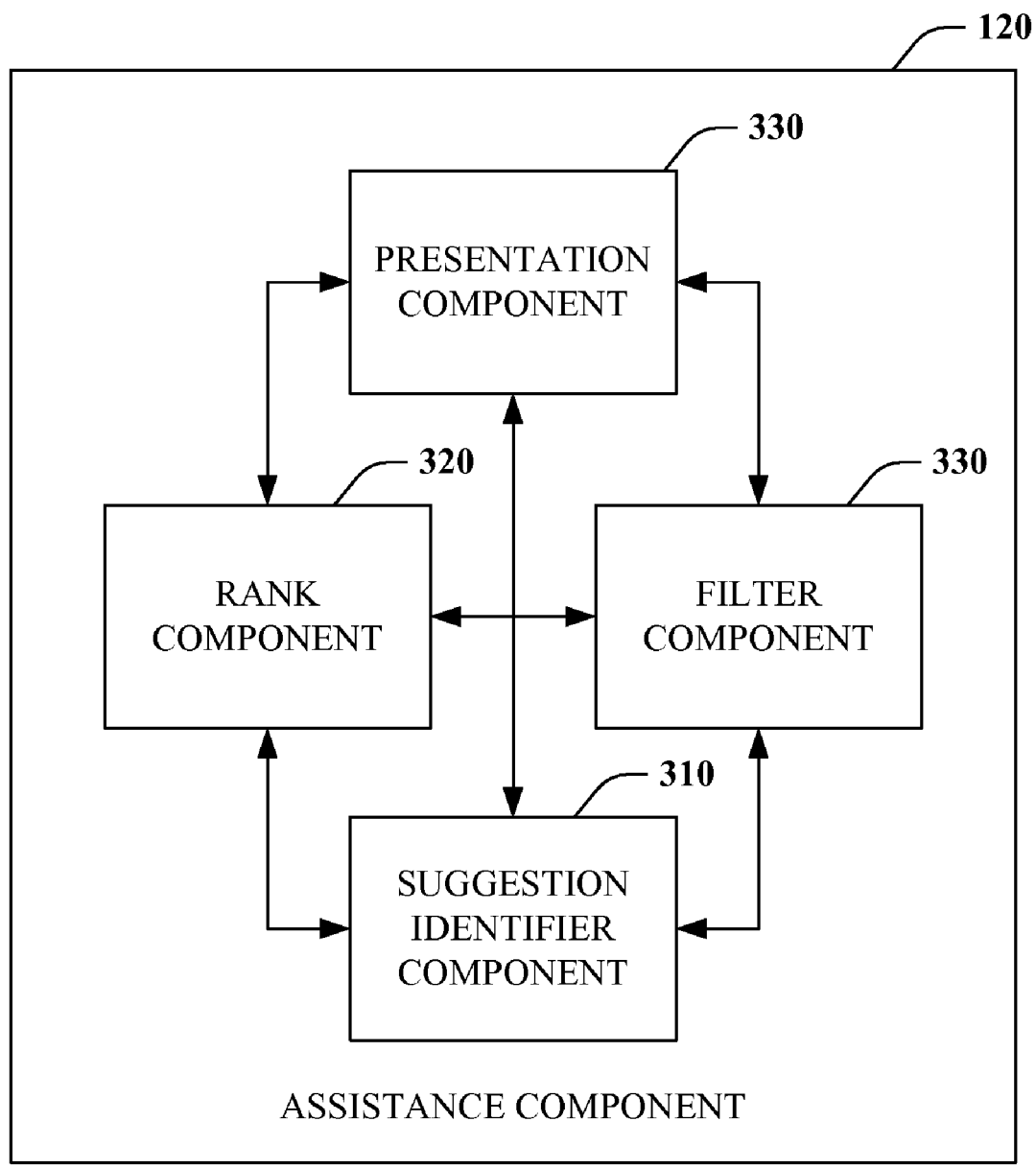
FIG. 3 is a block diagram of a representative assistance component.

Referring to FIG. 3, a representative assistance component 120 is illustrated in accordance with an aspect of the claimed subject matter. As previously described, the assistance component 120 provides programmatic assistance and/or feedback as a function of type information. In one instance, the assistance can include suggestions, recommendations or hints regarding code specification or completion. For example, upon detection of a trigger such as a dot (".") as in "X.", a drop down box, menu or the like can be spawned including completion recommendations. Suggestion identification component 310 provides a mechanism for generating suggestions as a function of type. For a type "String" for example, the suggestion identification component 310 can return members of the class or type including a property "length" and/or methods "compare( )" and "concatenate( )," amongst others.

Since in some cases a number of types are identified as potential dynamics types and the set of potential members is large, a ranking can be employed. In particular, ranking component 320 can determine and provide a relevancy ranking to suggestions provided by component 310. Filter component 330 can subsequently be employed to filter results as a function of their ranking to facilitate provisioning of most relevant information. Rankings can be generated as a function of any and/or all pertinent information including information relating to a type and/or associated suggestion(s). For example, the rank component 320 can determine or infer condition likelihoods. In the on going example, if a condition "SomeCondition" is more likely to be true than false, then type "String" and associated suggestions can be ranked higher in relevancy than those of type "Button." In another instances, rankings can be related to previous selections. Here, if a user was presented with a situation and selected a particular member for statement completion and that situation surfaced again, ranking can be influenced by the previous selection. Further yet, current and/or previous runs can be used like profile information to influence rankings. Similarly, programmer profile information can be employed in ranking calculations. For instance, it may be learned that a programmer prefers certain types to others. Still further yet, program scope, and more particularly types in scope, can be utilized to determine relevancy.

Presentation component 330 controls how assistance is presented to users. The presentation component 330 can utilize information from suggestion component 310, rank component 320 and/or filter component 330 to provide assistance in a manner that is likely to be most helpful to users. For example, the presentation component 330 can provide a predetermined number of suggestions in order of relevancy. Additionally or alternatively, ranking information can be provided with suggestions. Further yet, a determined precise type (e.g., via design time execution) can be identified as such and/or separated from approximate types (e.g., via static analysis). Still further yet, the presentation component can present an option to convert a dynamic type to a static type as will be described further infra.

Figure 4:
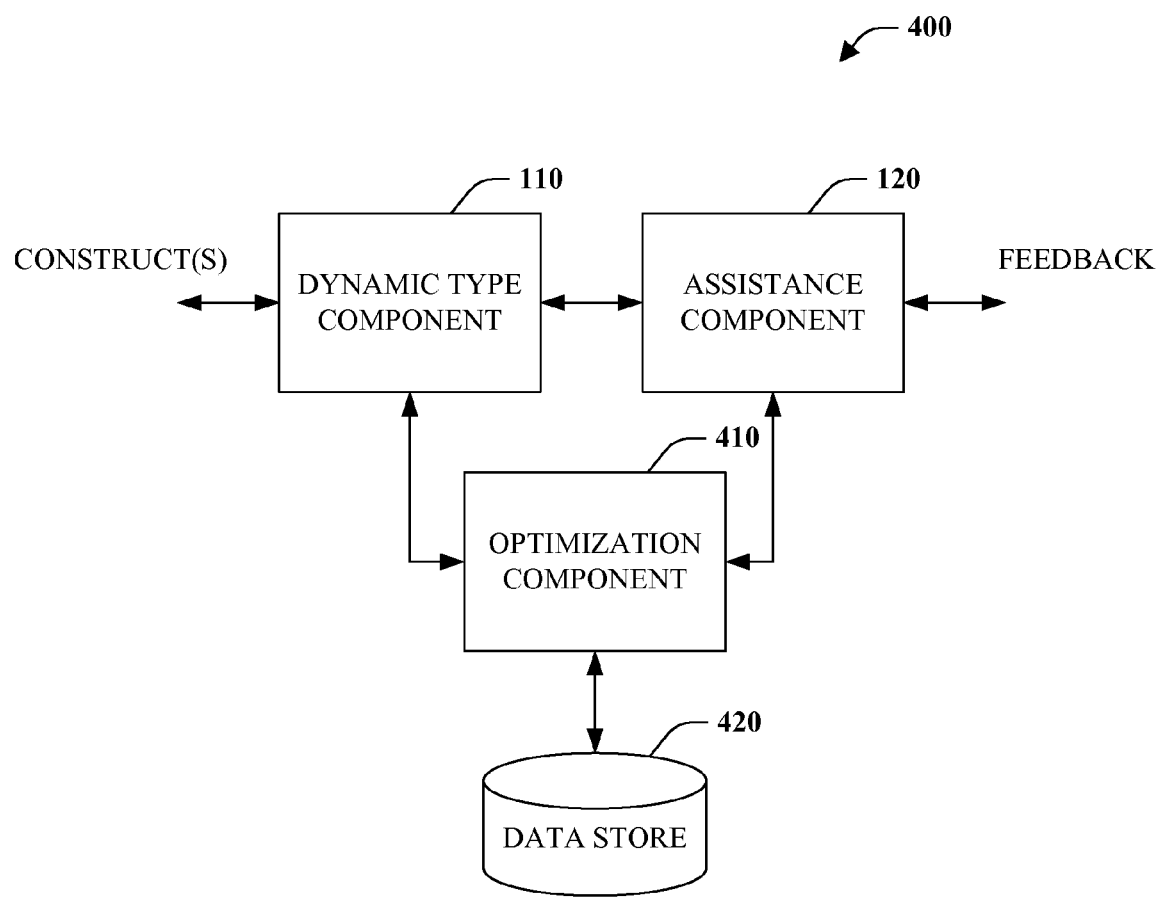
FIG. 4 is a block diagram of an optimized program development system.

FIG. 4 depicts a program development system 400 in accordance with an aspect of the claimed subject matter. Similar to system 100 of FIG. 1, the system 400 includes a dynamic type component 110 and an assistance component 120, as previously described. In brief, the dynamic type component 110 can determine or infer dynamic types at design time, which are utilized by the assistance component 400 to aid developers in program specification via mechanism such as automatic code completion, among other things.

Design time dynamic type determination or inference can be computationally intensive. Accordingly, optimization component 410 can be employed to aid processing. The optimization component 410 can utilize one or more process optimization mechanism including some of those known in the art. For example, the optimization component 410 can cache identified types and/or suggestions in data store 420. By way of example and not limitation, the optimization component 410 can cache types and/or associated assistance most frequently used and/or most likely to be used (e.g., predictive caching). Processing can then be adjusted to first check with optimization component 410 and more specifically data store 420 prior to any determination to avoid duplicative work.

Additionally or alternatively, type and/or assistance information can be indexed in a manner similar to those employed by databases and search engines to enable expeditious retrieval of appropriate information. Accordingly, optimization component 410 can be utilized to store and/or retrieve information indexed and housed in data store 420.

Figure 5:
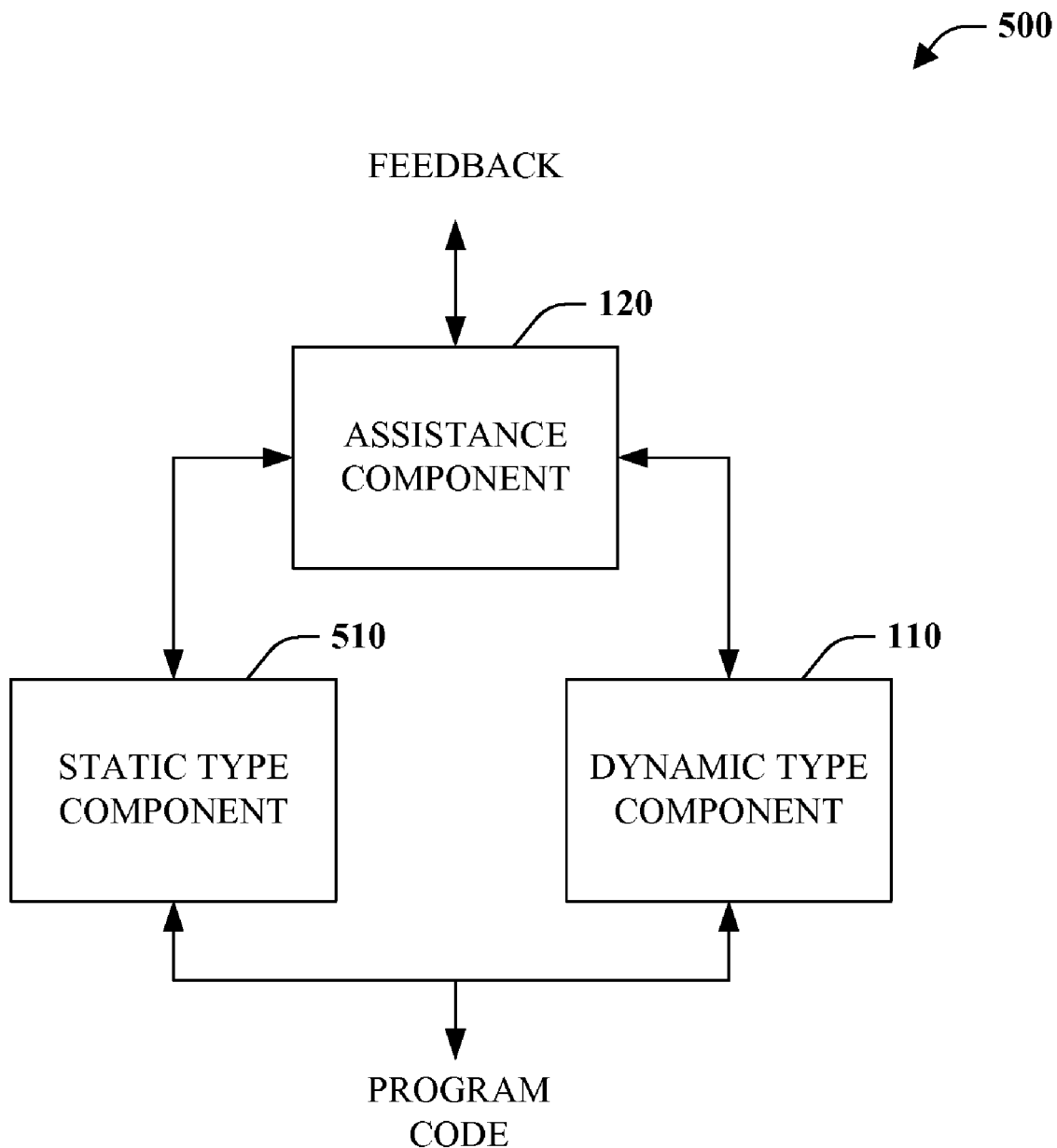
FIG. 5 is a block diagram of a program development system that provisions assistance for both static and dynamic types.

Referring to FIG. 5, program development system 500 is illustrated. In accordance with one aspect of this disclosure, code can be developed in a language that supports both static and dynamic typing and/or a hybrid thereof. Consequently, system 500 enables assistance to be afforded as a function of both early bound and late bound types. This provides a high degree of flexibility in program development in that assistance can be provided for both static and dynamic typing In particular, the system 500 includes the dynamic type component 110 and assistance component 120, as previously described. In addition, the system includes a static type component 510 communicatively coupled to the assistance component 120. The static type component 510 identifies, determines or infers static or early bound types and makes them available to the assistance component 120. The assistance component 120 can them provide programmatic assistance and/or feedback as a function of static types in addition to dynamic types. For example, in some situations developers will value type safety of static typing over the flexibility of dynamic typing.

More specifically, a feedback can be based on explicitly declared types and/or inferred static types. For example, consider the following exemplary early bound code segment "Dim X='Hello'" and "Dim X As String='Hello'." In either case, "X" has static type "String." Hence, specification of "X." (X "dot") can cause the assistance component 120 to identify members of type "String" including "length," "compare( )" and "concatenate( )," among others, for code completion.

Figure 6:
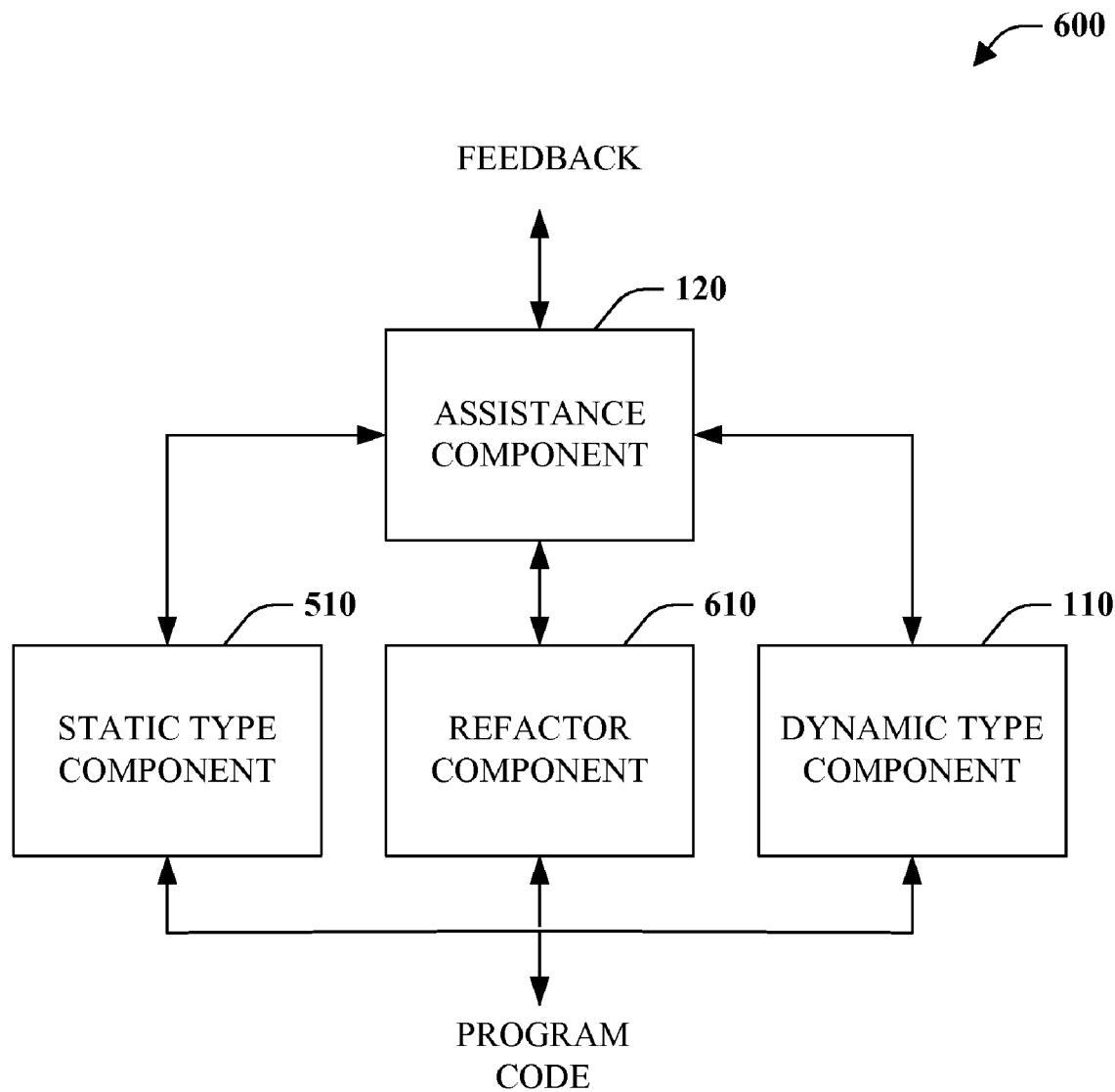
FIG. 6 is a block diagram of a program development system 600 that supports automatic refactoring.

FIG. 6 illustrates a program development system 600 that supports automatic refactoring between early and late bound constructs. Similar to system 500 of FIG. 5, system 600 includes the dynamic type component 110, assistance component 120 and static type component 510. The availability of both static and dynamic type based assistance via the aforementioned components provides opportunities for interaction between static and dynamic constructs. Refactor component 610 provides a mechanism to modify code automatically, for instance in response to user selections. In essence, refactor component 610 provides a refinement wherein a speculative type can be transformed into a more price type.

In one instance, a dynamic type can be converted to a static type upon selection and/or specification of a member. For instance, consider a list of members provided by the assistance component 120 as a function of a dynamic type. Once a member is selected from the list, member return type and member receiver is known, the refactor component 610 can cast related constructs as a function thereof. Consider the on going example presented again below for convenience:

```
Dim X As Object
If SomeCondition
    X = "Hello"
Else
    X = new Button( )
End If
```

Imagine addition of "Dim Y=X." subsequent to this loop and selection of "Length( )" from a list of members provided by assistance component 120. At this point, it can be determined that the result of the length method is an integer. Accordingly, the refactor component 610 can automatically transform "Y" from late bound to early bound by inserting an implicit cast around the dynamic call to return the static type as determined by the user-selected member. For example as follows: "Dim Y=CInt(X.Length( )) REM X Inferred as Integer." Alternatively, the call can be made into a static call by first converting the receiver as follows: "Dim Y=Cstr(X).Length( ) REM X inferred as Integer." In both these cases, these conversions can be inserted by a compiler or like component in generated code.

It is to be appreciated that in certain cases, a user may only want to select a name of an applicable member but remain in a late bound context. This can be dictated by a user preference and/or explicit/implicit declaration. For instance, the assistance component 120 can present members with an option such as a radio button wherein a user can select whether or not it is desired that the late bound context be preserved.

Program development system 600 as well as other like systems enables a different more exploratory programming process. It allows developers to use approximate type inference or determination to learn more about their program. In essence, a compiler or other development component can provide a plurality of options among which a programmer can select and utilize to exit the late bound world and enter an early bound world or vice versa. In one instance, a late bound construct including all its flexibility can be refactored into a safer construct that is more restrictive.

Figure 7:
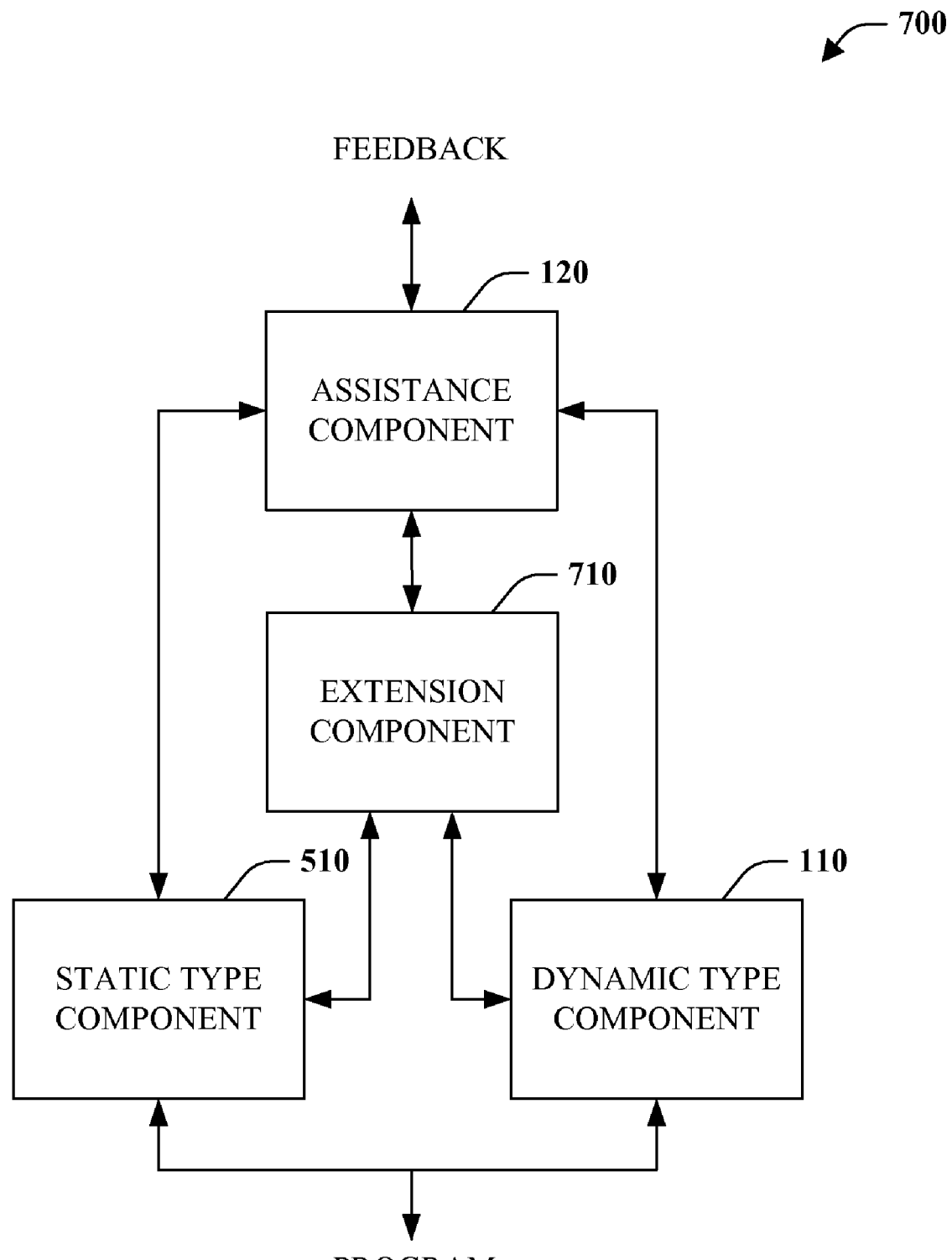
FIG. 7 is a block diagram of an extendable program development system.

Turning to FIG. 7, an extendible program development system 700 is illustrated in accordance with an aspect of the claimed subject matter. System 700 includes the same components as system 500 of FIG. 5 including the dynamic type component 110, assistance component 120 and static type component 510. As previously described, these components are operable to provide programmatic assistance as a function of one or both of static and dynamic types at design time. As is to be appreciated, the system 500 can include certain standard or default functionalities. Further provided in system 700 is extension component 710 communicatively coupled to each component to enable extension thereof. In one particular implementation, the extension component 710 can accept and employ external functionality provided by a plug-in. Thus, system 700 can be termed extensible and/or pluggable. By way of example and not limitation, a ranking algorithm can be plugged into and utilized by the system 700 with respect to provisioning of assistance. Further yet, metadata including members that might be desirable can be plugged into the system 700. Further yet, the extension component 710 can enable extension utilizing over a network via employment of a web service and/or connectivity to a database. For instance, the extension component 710 can provide a mechanism to allow the system to connect to and use a repository of schemas or other metadata.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the dynamic type component 110 can employ such mechanisms to infer dynamic types from static information at design time. Similarly, the assistance component 120 can employ similar mechanisms to rank, filter and/or present assistance.

Figure 8:
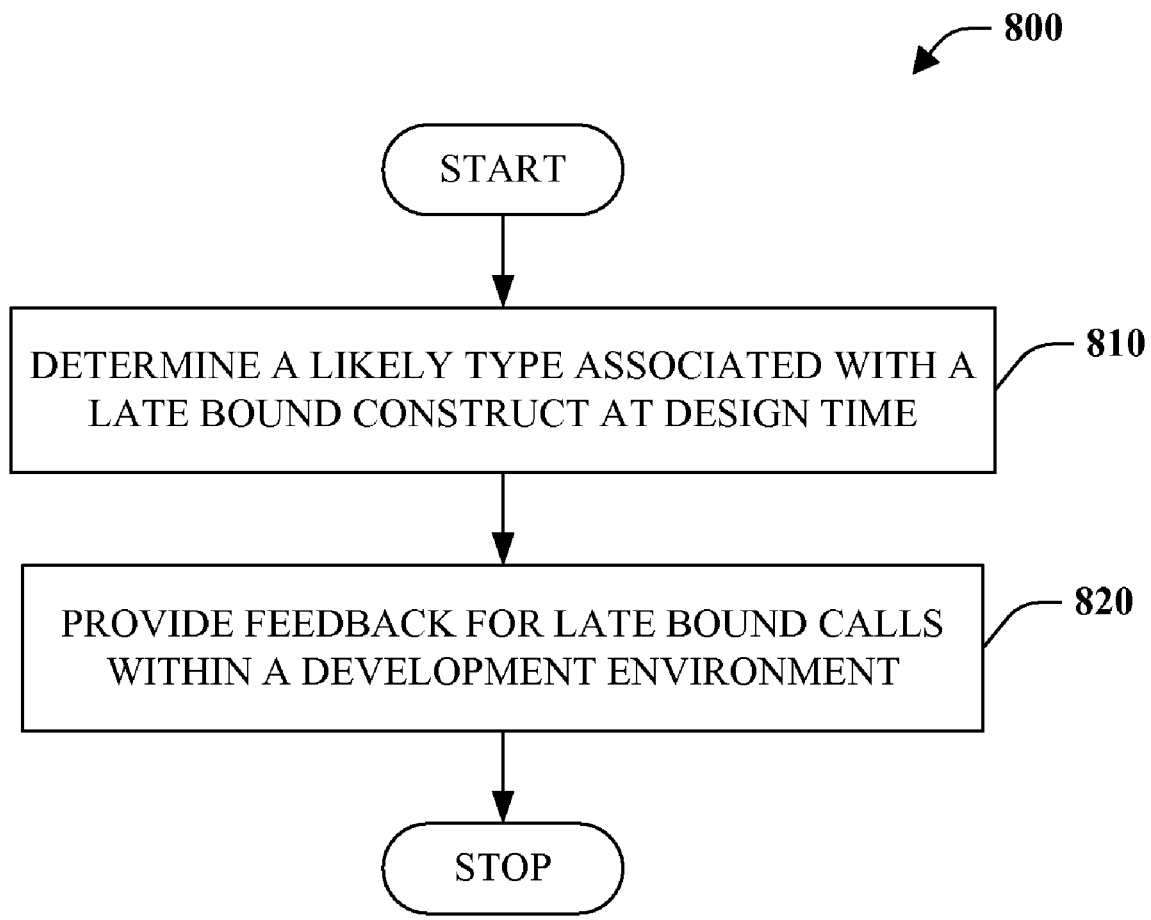
FIG. 8 is a flow chart diagram of a method of facilitating program development.
Figure 9:
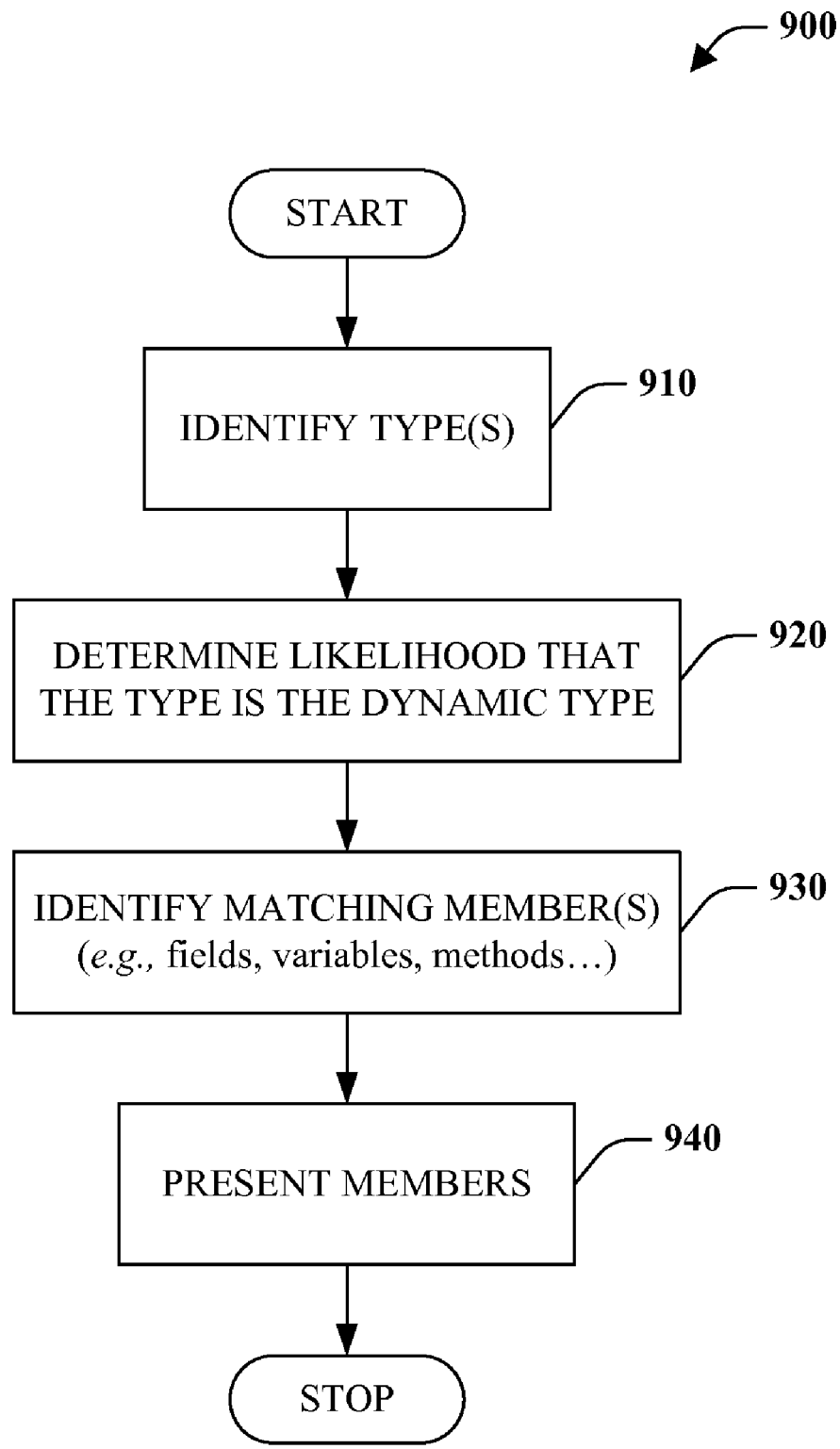
FIG. 9 is a flow chart diagram of a method of provisioning programmatic assistance.
Figure 10:
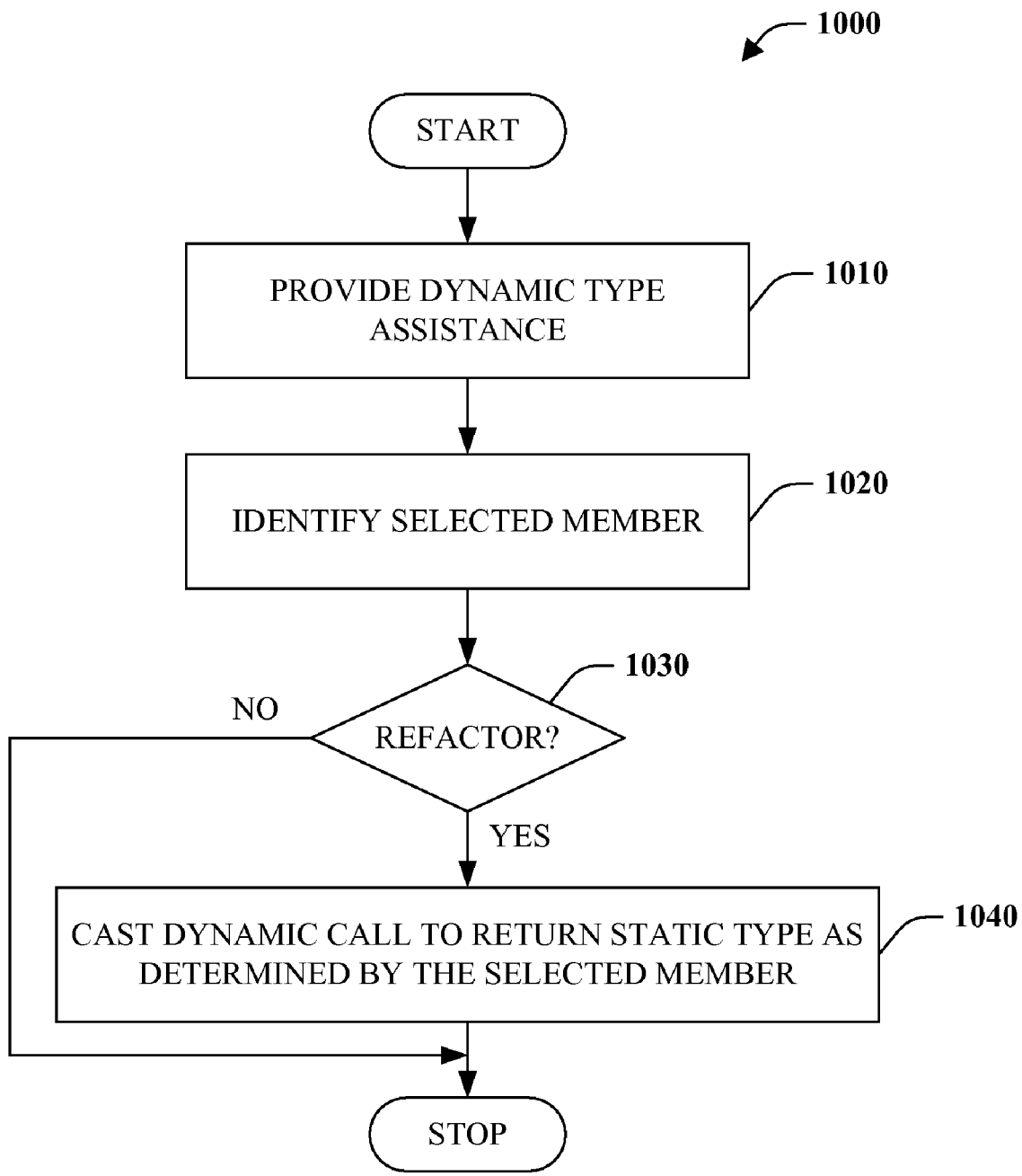
FIG. 10 is a flow chart diagram of a method of transitioning between late bound and early bound contexts.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, a method of facilitating program development 800 is illustrated in accordance with an aspect of the claimed subject matter. At reference numeral 810, a likely type associated with a late bound construct is determined at design time. In one instance, the determination can correspond to inferring approximate types from static information, for example via static program flow analysis and/or other contextual information such as programmer profile, preferences, previous executions and the like. According to one aspect, the set of potential late bound types is a superset of static types. In another instance, determination can pertain to identifying a precise type from design time execution. At numeral 820, feedback is provided for late bound calls within a development environment. In other words, programmatic assistance is afforded as a function of one or more determined types. For example, upon specification of a trigger such as a dot operator ("."), members associated with precise and/or approximate types can be presented to a programmer. The program can then select a provided member for automatic completion, continue typing to narrow choices down and subsequently invoke automatic completion or fully specify a desired member.

FIG. 9 depicts a method of provisioning programmatic assistance 900 in accordance with an aspect of this disclosure. At reference numeral 910, programmatic types are identified, determined, inferred or otherwise ascertained. At numeral 920, one or more types are analyzed to determine the likelihood that they correspond to a dynamic type. This can be determined utilizing a variety of factors. For example, precise types identified from execution are more likely to the dynamic type than approximate types inferred from static control flow analysis. Similarly, some approximate types may be more likely than others in light of contextual information about a program and/or a programmer. At reference 930, members are identified that match at least a subset of ascertained types. Members can correspond to variables, fields, methods, functions and/or the like. Furthermore, matching members can be filtered as a function of context such as most frequently used and/or most likely to be used. At reference numeral 940, members are presented to a user. This corresponds to a list members option of programmatic assistance. This list can be organized and presented in a manner most useful to a programmer. For example, members can be organized in order of relevancy as a function of type and/or members wherein more pertinent suggestions are presented first and least relevant suggestions last. The presentation can also be limited to the top K relevant suggestions. Further yet, suggestions, recommendations, hints or the like can be labeled with relevancy scores and/or delineated in segments or tiers based thereon. For example, a member that is a function of a precise type can be graphically delineated from members associated with approximate types.

Referring to FIG. 10, a flow chart diagram is depicted showing a method 1000 of transitioning between late bound and early bound contexts. While late bound and early bound worlds can be separate yet similar, in accordance with one aspect they can interact. At reference numeral 1010, dynamic type assistance is provided. For example, list member assistance can be afforded wherein a plurality of members are listed for potential selection and automatic code completion. At numeral 1020, a selected member is identified. At reference numeral 1030, a determination is made whether or not to provide automatic code refactoring. This decision can be made based on whether or not refactoring is possible and/or beneficial and/or use preferences permitting or restricting such functionality, among other things. If at numeral 1030 refactoring is not determined to be required, the method can simply terminate. Otherwise, the method can continue at numeral 1040, where a dynamic call can be cast so as to return a static type in accordance with a selected member. In this manner, programmers can code in an exploratory and agile manner utilizing dynamic typing and assistance provided therewith. Upon selection of particular members, portions of the code can be automatically refactored into static types thereby providing improved code safety along with efficient execution.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
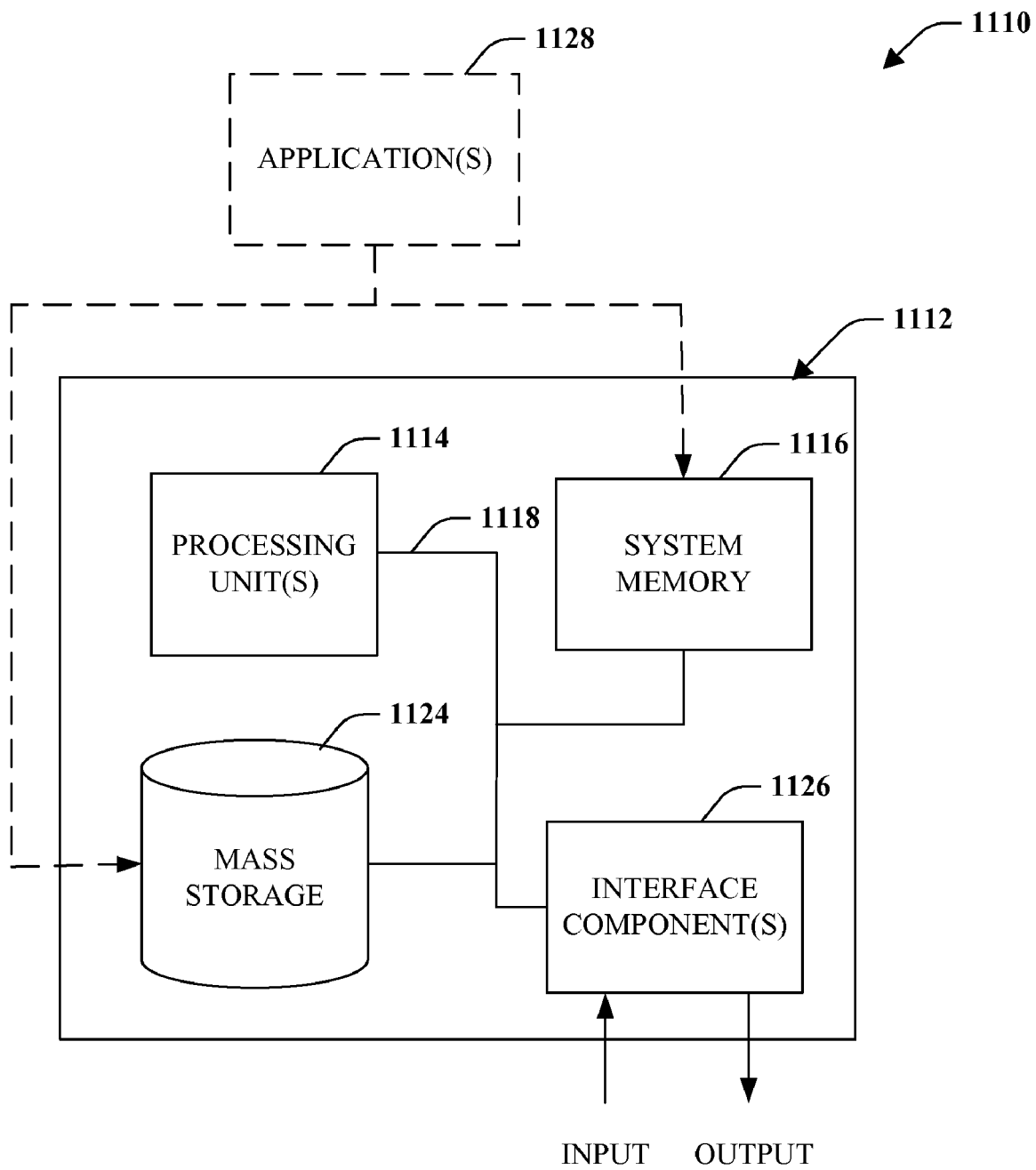
FIG. 11 is a schematic block diagram illustrating a suitable operating environment for aspects of the subject disclosure.
Figure 12:
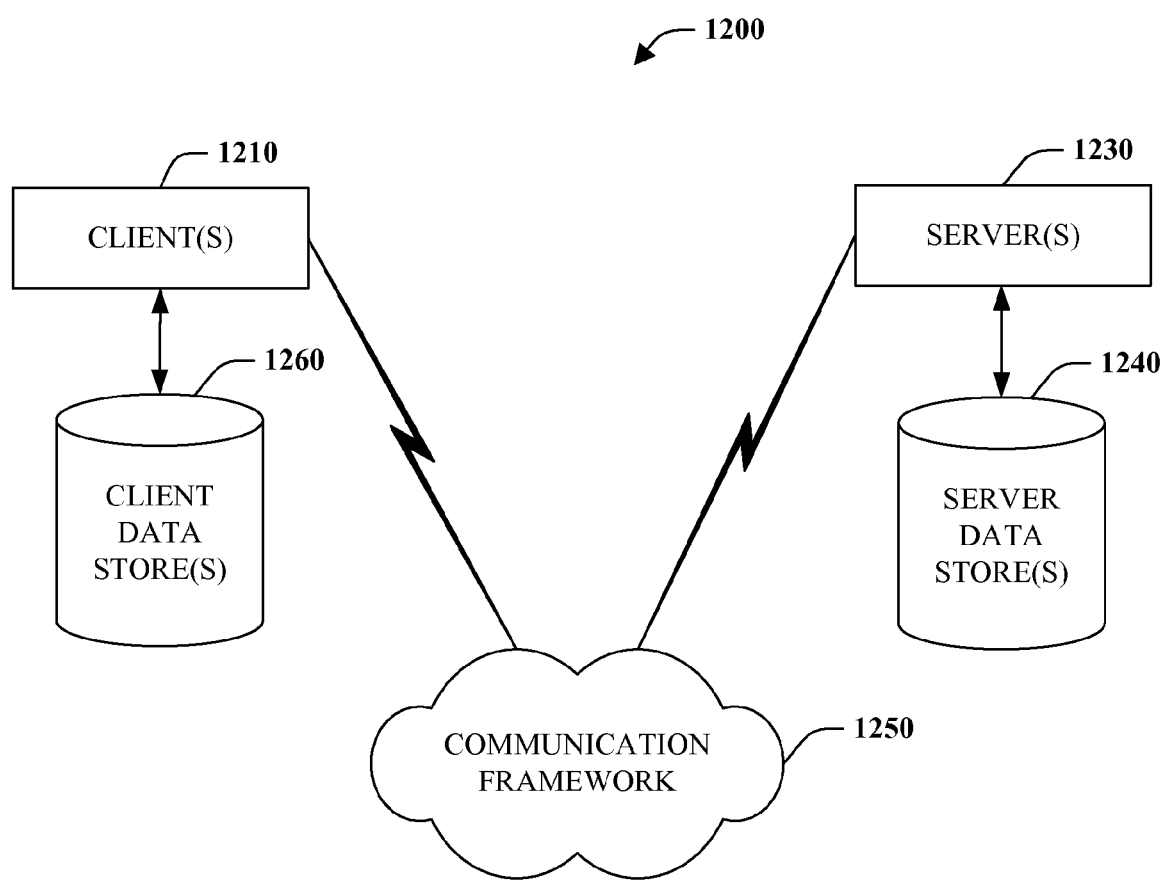
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/nonvolatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

For example, programs can be developed on one client 1210 distributed for execution on other clients 1210 via a client 1210 and or server 1230. Furthermore, a program development environment executing on a client can interact with a remote server 1230 utilizing the communication framework 1250 to acquire metadata such as schemas to enable provisioning of relevant assistance such as member identification. Similarly, ranking algorithms or the like can be downloaded from a server 1230 or other client 1210 across the communication framework 1250 to alter the manner and/or type of assistance provided.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. An integrated program development system, comprising:
   a dynamic type component that identifies one or more candidate types for late bound, dynamically-typed programmatic constructs by approximating the late bound, dynamically-typed programmatic constructs with static information; and
   an assistance component that provides programmatic suggestions for the late bound, dynamically-typed programmatic constructs in a code editor as a function of the identified candidate types to facilitate program specification, wherein at least one of the programmatic suggestions identifies a member that matches a candidate type, the member being an operator construct associated with source code representing a class, the operator construct indicative of one or more member types as possible candidates for late bound types resolution, the one or more possible member types being displayed by the assistance component for selection within the integrated program development system.

2. The system of claim 1, the dynamic type component performs static analysis of the program to identify likely types for the late bound constructs.

3. The system of claim 1, the dynamic type component identifies a precise type for a late bound construct via design time execution of the program.

4. The system of claim 1, further comprising a static type component that identifies types for early bound programmatic constructs for use by the assistance component.

5. The system of claim 1, further comprising a filter component that restricts provided suggestions to a predetermined number of most relevant suggestions.

6. The system of claim 5, further comprising a ranking component that ranks the relevancy of each suggestion as a function of the likelihood that an associated type is correct.

7. The system of claim 5, at least one suggestion identifies a member that matches a candidate type.

8. The system of claim 1, further comprising an optimization component that persists the candidate types and/or the associated suggestions to optimize execution.

9. The system of claim 1, further comprising a refactor component that converts a dynamic type into a static type in accordance with programmer specification.

10. The system of claim 1, further comprising an extension component that adds or alters behavior of the dynamic type component and/or assistant component.

11. A method of assisting object-oriented program development, comprising:
    determining at least one type for a receiver of a dynamically-typed late bound call at design time by approximating the dynamically-typed late bound call with static information; and
    displaying a set of members of the determined dynamic type to a programmer for selection and automatic code completion including automatically completing dynamically-typed late bound calls for the determined dynamic type, wherein one or more programmatic suggestions are provided which identify a member that matches a candidate type, the member being an operator construct associated with source code representing a class, the operator construct indicative of one or more member types as possible candidates for late bound types resolution, the one or more possible member types being displayed for selection by a user at design time during object-oriented program development.

12. The method of claim 11, comprising performing static analysis of code to infer the type.

13. The method of claim 11, comprising identifying the type from design time code execution.

14. The method of claim 11, displaying the members in order of relevancy determined by likelihood that the type is correct.

15. The method of claim 14, further comprising indicating members derived from a precise type and/or speculative type.

16. The method of claim 11, further comprising retrieving the at least one type and/or members from a cache.

17. The method of claim 11, further comprising employing an index to identify the type members.

18. The method of claim 11, further comprising replacing a dynamic call with a static call as a function of a selected member.

19. A system to facilitate program specification for a program developed within a code editing environment, comprising:
    a processor;
    means for determining one or more likely types for dynamically-typed late bound calls at design time by approximating the dynamically-typed late bound calls with static information; and
    means for displaying within a code editor members of the determined dynamic type that match the one or more determined types, wherein one or more programmatic suggestions are provided which identify a member that matches a candidate type, the member being an operator construct associated with source code representing a class, the operator construct indicative of one or more member types as possible candidates for late bound types resolution, the one or more possible member types being displayed for selection by a user at design time during program development.

20. The system of claim 19, further comprising a means for determining one or more static types.

* * * * *